Nov. 12, 1940.  M. EVOY  2,221,396
AUTOMATIC WEIGHING CONVEYER
Filed April 9, 1938  3 Sheets-Sheet 3

INVENTOR
Martin Evoy
BY
Benner + Harding
ATTORNEYS.

WITNESS:

Patented Nov. 12, 1940

2,221,396

UNITED STATES PATENT OFFICE 2,221,396

AUTOMATIC WEIGHING CONVEYER

Martin Evoy, Abington, Pa.

Application April 9, 1938, Serial No. 201,065

3 Claims. (Cl. 198—37)

This invention is directed to a weighing conveyer, preferably automatically controlled and primarily intended for use in the weighing and control of delivery of a light textile fibre such as, for example, wool.

It is an object of the present invention to provide a mechanism which will continuously indicate, and, if desired, record, the production or through-put of a textile fibre such as wool.

It is a further object of this invention to produce a mechanism which will automatically maintain at any predetermined constant level the production or through-put of such textile fibre.

Further objects of this invention will appear from the following description read in conjunction with the accompanying drawings, which illustrate a preferred embodiment of the invention, and in which.

Figure 1:
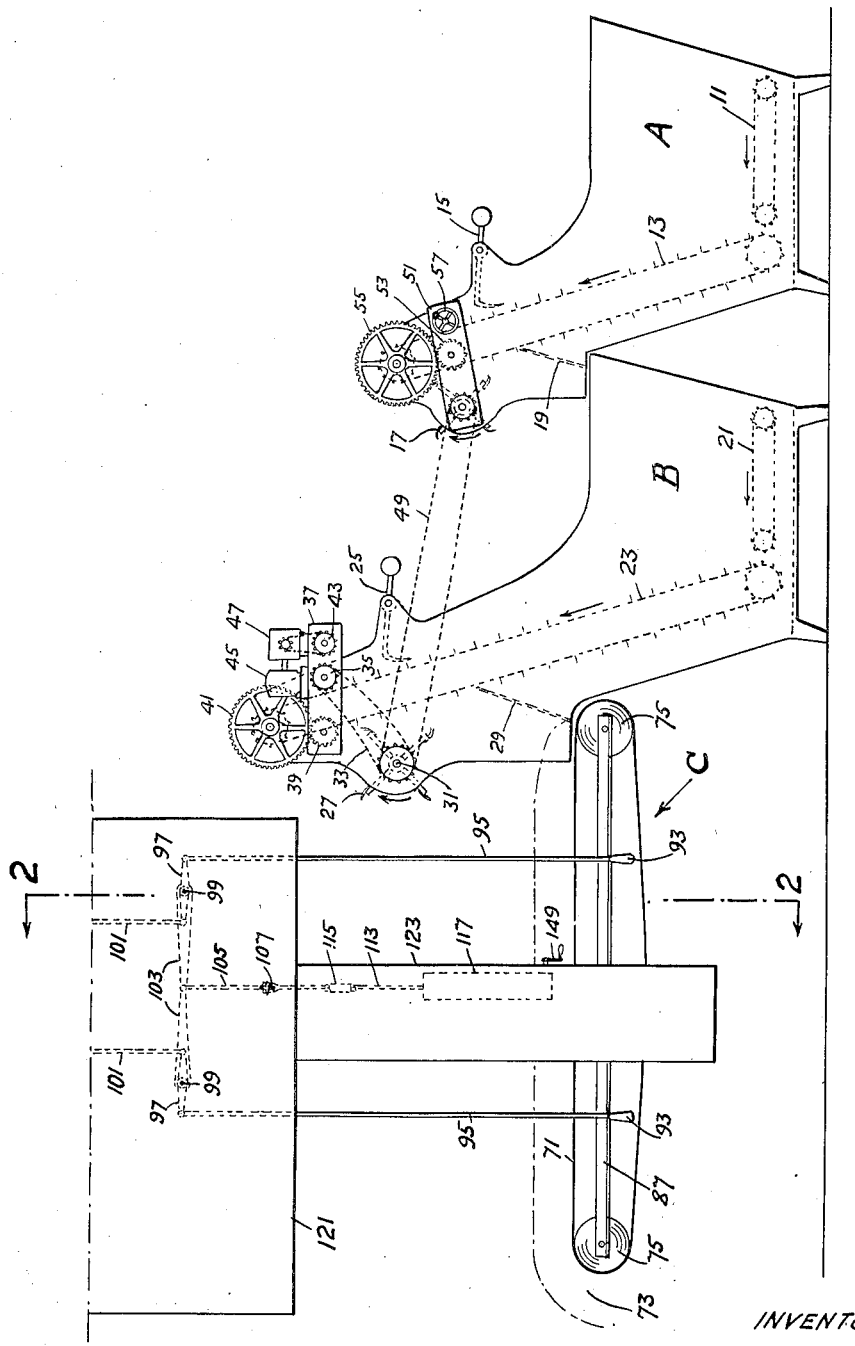
Figure 1 is a side elevation of the mechanism in accordance with the present invention.
Figure 2:
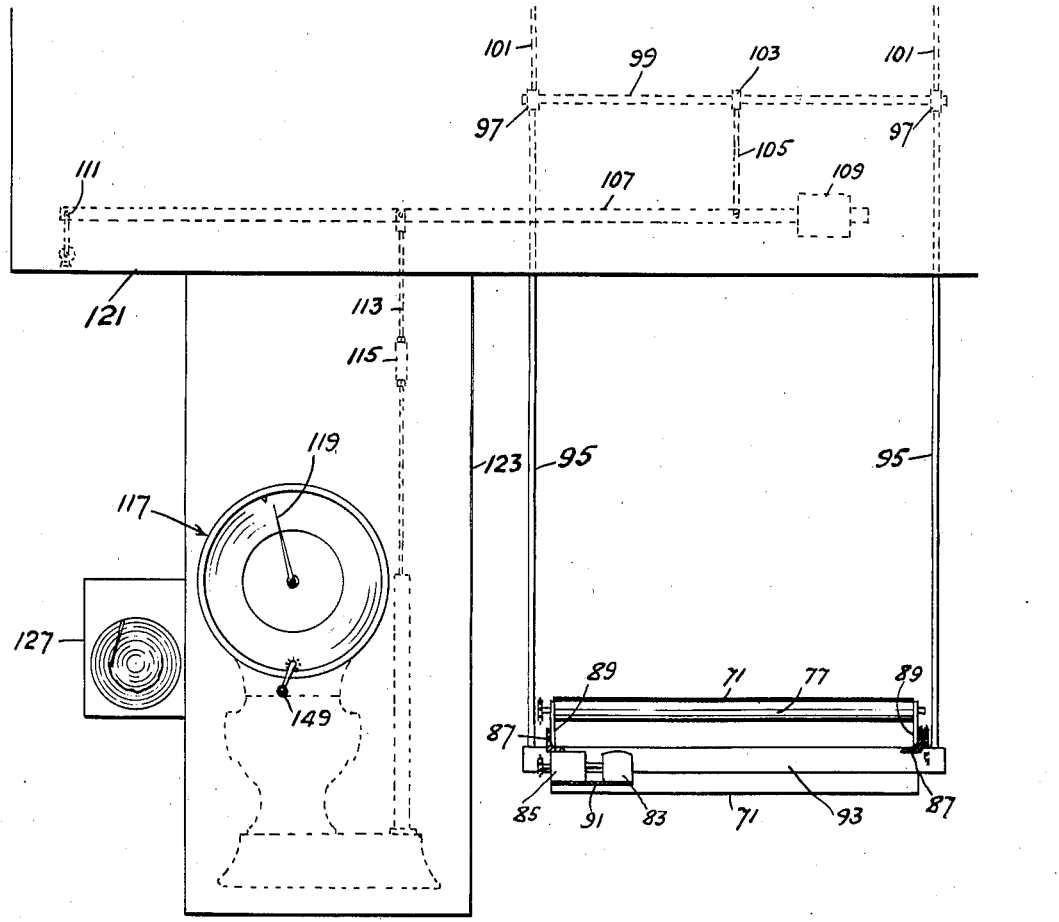
Figure 2 is a sectional view taken on the line 2—2 of Figure 1.

While the mechanism in accordance with this invention is obviously suitable for many purposes, it will, for clarity, be described with reference to the feeding and weighing of wool fibres.

The mechanism in accordance with the present invention comprises essentially means for feeding the wool fibres onto a moving conveyer belt, which, together with its supporting and driving means, is suitably connected to weighing and recording mechanism. Associated with the weighing mechanism is automatic control means actuated by changes in the weight of wool fibres on the conveyor for regulating the amount of wool fed to the conveyer. For convenience, these various elements will be described separately.

Feeding mechanism

The wool is fed to the weighing conveyer by means of two substantially identical textile feeders A, B, which are of conventional construction and are arranged in tandem. The wool is fed by hand into the feeder A, where a moving conveyer belt 11 carries it to a spike apron 13, which in turn conveys the fibres upward past the oscillating picker or comb 15, through the beater 17 and eventually down the chute 19 into feeder B. Here a similar conveyer 21 carries the wool to a spike apron 23, which in turn conveys the wool past the picker or comb 25, the beater 27, and so down the chute 29 to the weighing conveyer C. Since the mechanism just described is not novel per se and is well known in the art, no further description thereof need be given.

The spike aprons 13 and 23 are driven at independently regulable speeds in the following manner. The beater 27 is secured to a positively driven shaft 31, from which is driven, by means of the chain 33 and sprocket 35, one member of a suitable variable speed transmission mechanism 37, such as, for example, a Reeves transmission. The other member of this variable speed transmission drives, through gears 39 and 41, the spike apron 23. The variable speed transmission 37 is operated by movement of the sprocket 43, which is actuated by an electric motor 45 operating through a speed reducer 47.

The beater 17 of the feeder A is likewise directly connected with one member of a second variable speed transmission member 51, power being transmitted from the driven shaft 31 by means of the chain 49. The second member of the variable speed transmission 51 drives, through gears 53 and 55, the spike apron 13. The variable speed transmission is controlled by movement of the hand wheel 57.

The weighing conveyer

The weighing conveyer C comprises essentially an endless conveyer belt 71 which receives the wool fibres from the chute 29 of the feeder B and delivers them at 73 to a second conveyer, not shown, which takes them to any desired processing point. The conveyer belt 71 is of such size and is driven at constant, fixed rate of speed such, for example, that it will have upon it at all times one minute's production of wool fibres.

Figure 3:
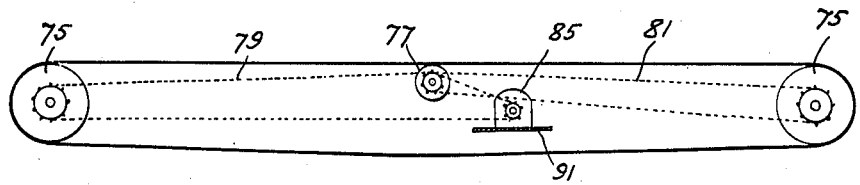
Figure 3 is a diagrammatic side elevation of the weighing conveyer proper.

The conveyer belt 71 is supported on and driven by a pair of end rolls 75 and a central supporting roll 77. These rolls are driven, as best shown in Figure 3, by chains 79 and 81, from an electric motor 83 and speed reducer 85. The rolls 75 are journaled in a pair of longitudinal frame members 87, while the roll 77 is journaled in a pair of brackets 89 secured to the frame members 87, and the motor 83 and speed changer 85 are mounted on a platform 91 likewise suspended from one of the frame members 87. Accordingly, the entire weight of the weighing conveyer and associated driving elements is supported on the two frame members 87. The frame members 87 in turn rest upon a pair of cross bars 93 secured to the lower ends of four hangers 95. Each hanger 95 is pivotally connected at its upper end to the short arm of a lever 97. These levers 97 form two opposed pairs, the levers of each pair being keyed, intermediate their ends, to a floating shaft 99. At their ends opposite the point of connection with the hangers 95, the levers are pivotally connected to fixed hangers 101 which are fixedly secured in the ceiling. Keyed to each of the two shafts 99 intermediate its ends is an arm 103, and these two arms are pivotally connected to the upper end of a single rod 105.

The lower end of the rod 105 is pivotally secured adjacent the free end of the lever 107 (which is also provided with a counter weight 109), which lever has a fixed pivot at 111, and, intermediate the fixed pivot and the point of connection of the link 105, is connected with the rod 113. This rod 113, which is provided with a turnbuckle 115, is connected in conventional manner with the scale 117, so that its movement is transmitted to the pointer 119.

The system of levers just described is all enclosed within a housing 121, while the scale 117 is enclosed in a second housing 123 supported just below the housing 121.

By the mechanism just described variations in load carried on the conveyer belt 71 will be transmitted, in the ratio determined by the lever mechanism, to the scale 117, and indicated thereon by means of the pointer 119. The scale dial 125 will, conveniently, be graduated in units sixty times as great as that which the scale is really weighing. Thus, for example, the scale dial will indicate pounds per hour passing over the conveyer belt 71 instead of pounds per minute.

Associated with the scale 117 in conventional manner there may be a recording mechanism 127 calibrated to read in pounds per hour passing over the conveyer belt 71 at any given moment of time. In this way a permanent record of production and of the accuracy of control thereof may be kept.

*The automatic control mechanism*

Figure 4:
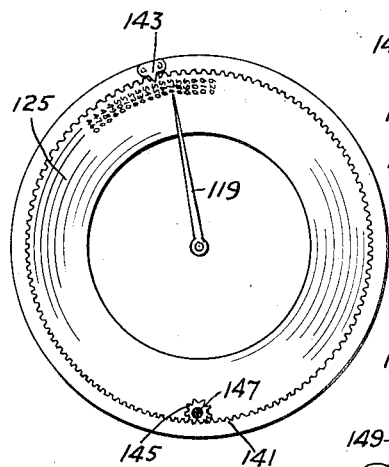
Figure 4 is a detail view of the front of the indicating and automatic control mechanism.
Figure 5:
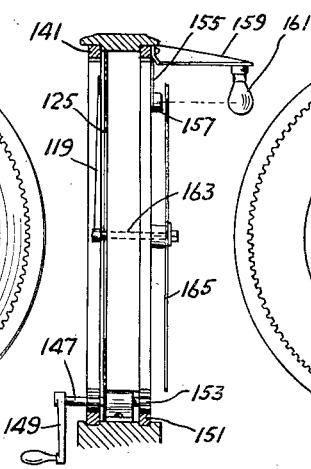
Figure 5 is a sectional view of the indicating and automatic control mechanism.
Figure 6:
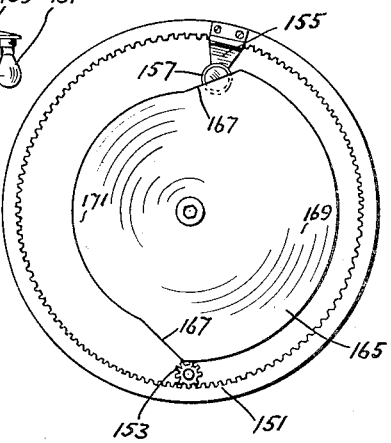
Figure 6 is a detail view of the rear of the indicating and automatic control mechanism.

The automatic control mechanism is associated with the indicating dial 125 of scale 117, as shown best in Figures 4, 5 and 6. The indicating dial 125 of the scale 117 is fixed, while the pointer 119 rotates with variations in load on the conveyer belt 71 (in Figures 4, 5 and 6, for convenience, the connections between the pointer 119 and the weighing mechanism of the scale have not been shown). A ring 141 is independently rotatable around the periphery of the fixed indicating dial 125, and carries a pointer 143, which may be set at any desired reading on the dial 125. The ring 141 is provided with gear teeth on its inner surface, which mesh with a pinion 145 set on a shaft 147 and operated by means of a small crank 149. A similar ring 151 is mounted behind the fixed dial 125, and is likewise moved by a pinion 153 mounted on the same shaft as the pinion 145. The ring 151 carries a bracket 155 supporting a photoelectric cell 157 and a bracket 159 supporting a source of light 161, the source of light and the photoelectric cell being arranged in line one with the other as shown in Figure 5.

By movement of the crank 149 the two rings 141, 151 are accordingly caused to move to the same extent, and consequently the position, with reference to the circumference of the fixed dial 125, of the photoelectric cell 157 is fixed in relation to the position of the pointer 143 carried by the ring 141.

Secured to the same spindle 163 on which the pointer 119 is mounted, but positioned at the rear of the dial 125, is a disc 165, cut on two diameters, so that half the periphery lies on a radius appreciably greater than that of the other half. The gradation from one radius to the other, along the lines 167, is relatively gradual and makes an angle of about 30° with a tangent. The disc 165 is positioned to rotate between the photoelectric cell 157 and the source of light 161, so that when its portion of greater radius 169 is positioned between the source of light and the photoelectric cell, no illumination will fall on the cell; while when its portion of lesser radius 171 is in the corresponding position, the cell will receive full illumination. When the disc rotates so that the portions 167 are positioned between the cell and the source of light, the cell will receive a varying quantity of light, depending upon the exact position of the disc.

Accordingly, since the disc 165 rotates with the pointer 119, the amount of light falling on the photoelectric cell will be determined by the load carried at any moment on the conveyer belt 71.

Figure 7:
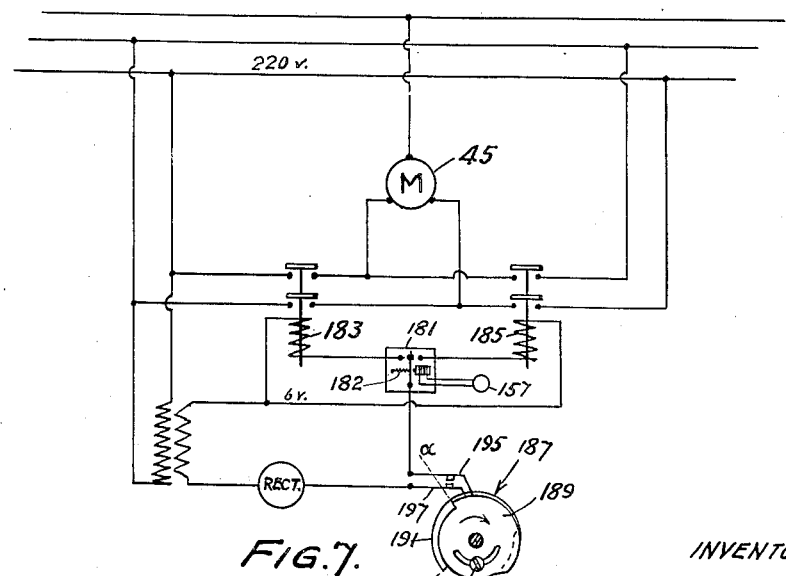
Figure 7 is a wiring diagram for the automatic control mechanism.

The photoelectric cell 157 is connected to a sensitive relay 181, one side of which is connected to the low voltage side of a power relay 183, and the other side of which is connected to the low voltage side of a second power relay 185, both connections being made through a time switch 187. Closing of the power relay 183 will cause motor 45 associated with the textile feeder B to be energized to rotate in one direction, while closing of the power relay 185 will cause motor 45 to be energized to rotate in the opposite direction, as shown in Figure 7.

The time switch 187 comprises two cams 189 and 191, respectively, rotated together at a constant slow speed, for example, of about 2 R. P. M. The two cams may be relatively adjusted and clamped in adjusted position by means of the screw 193. A contact member 195 rides on the cam 189, while a second contact member 197 rides on the cam 191. Since contact can only be made when member 197 is riding on the high part of cam 191 and member 195 is riding on the low part of cam 189, the sensitive relay 181 will only be energized when the contact members are riding between the points α and β on the two cams, that is, as shown in Figure 7, for about one quarter of the revolution.

*Operation of device*

We shall assume it is desired to obtain a throughput of wool fibres of 550 pounds per hour. The pointer 143 carried by the ring 141 will be set at this value, as shown in Figure 4, by movement of the crank 149. This will rotate the ring 151 so as to bring the photoelectric cell 157 and its associated light source to a point on the periphery of the dial 125 such that, when the pointer 119 stands at a value higher than 550, the disc 165 will be so positioned that the amount of illumination falling on the photoelectric cell 157 will be below the critical value necessary to energize the sensitive relay 181, while when the pointer 119 stands below the value of 550 pounds, the amount of illumination will be in excess of such critical value.

The operator will then feed fibres to the feeder A at approximately the desired rate, very considerable variations in the rate of feed to feeder A being permissible. At the same time the speed of the spike apron 13 will be so adjusted by movement of the hand wheel 57 that the hopper of the second feeder B will be kept filled to a substantially constant level. This level need by no means be kept exactly constant, but the feeder B must neither be starved so that it is unable to deliver the proper quantity to the weighing conveyer C, nor must it be overfed so that fibres will spill out. In practice, the hopper of the second feeder B will be found to be filling or emptying slowly all the time, and at least hourly adjustments of the hand wheel 57 will be necessary or desirable. This could be done automatically, the control being accomplished by a beam of light directed across the hopper of the second feeder B and onto a photoelectric cell; but such automatic control of the first feeder A is not ordinarily necessary.

The second feeder B will deliver the wool fibres down the chute 29 onto the conveyer belt 71 forming a layer rising to approximately the height shown by the broken line in Figure 1. The conveyer belt 71, as indicated, will have upon it at all times one minute's production; and consequently, if the production is to be 550 pounds per hour, it will carry slightly more than 9 pounds of fibres.

Through the weighing mechanism described the weight of the fibres on the conveyer belt 71 at any moment is transmitted to the scale 117 where it is shown by the pointer 119 in pounds per hour. At the same time a permanent record is being made by the recording mechanism 127.

If slightly more than the desired quantity of wool fibres are present on the conveyer belt 71, the pointer 119 will, of course, indicate a higher rate of production than the desired 550 pounds per hour. When this occurs, as previously described, the disc 165 occupies such a position with respect to the photoelectric cell 157 that the amount of illumination falling on the latter is below that necessary to cause energization of the sensitive relay 181. Consequently, the spring 182 will hold the contact arm of this relay in position to cause energization of the power relay 183. In such case, when the time switch 189 functions so as to close the contacts 195, 197, the power relay 183 will be energized for a brief interval, and the motor 45 will be driven to cause rotation of the pinion 43, which in turn operates the speed changing mechanism 37 so as to decrease the rate at which the spike apron 23 travels and thus decrease the quantity of fibres fed to the conveyer belt 71.

On the other hand, if the weight of fibres on the belt 71 is less than the desired quantity, the pointer 119 will indicate a throughput less than the desired 550 pounds per hour; and the position of the disc 165 will be such that the illumination falling on the photoelectric cell 157 is sufficient to energize the sensitive relay 181 and cause the contact arm thereof to close, against the action of the spring 182, the circuit to the power relay 185. In this way, when the time clock 187 causes the contacts 195, 197 to close, the relay 185 will be closed and motor 45 will be actuated in the reverse direction, causing a reverse movement of the pinion 43 and thus, through the speed changer 37, speeding up the spike apron 23.

In practice, with the time switch 187 operating at frequent regular intervals, the speed of the conveyor 23 will be accurately controlled to deliver a substantially constant predetermined quantity of wool fibres to the conveyer belt 71 and thence to the processing equipment. In an actual installation of the character described, the weight of fibres passing over the conveyer per hour will become substantially constant within twenty minutes of operation and will continue constant, with a total variation of not more than 0.25%, throughout the day.

What I claim and desire to protect by Letters Patent is:

1. An apparatus of the character described comprising, in combination, a conveyer belt and a weighing means associated therewith, means for feeding material to the conveyer belt, including two independently controllable feeders arranged in tandem, so that one feeds the other, and means actuable by said weighing means for controlling the rate of operation of that feeder nearer in sequence to the conveyer belt whereby material may be fed to and over said conveyer at a predetermined rate, a source of light, a photoelectric cell, a rotatable member mounted between the photoelectric cell and the source of light and movable responsively to the load on said weighing means, said member having opposite obliquely bounded portions whereby the amount of light falling upon the photoelectric cell depends upon the load carried at any moment on the weighing conveyer belt, and the obliquely bounded portions provide relatively gradual varying interception of light to be received on the cell depending upon the position assumed by the rotatable member thereby maintaining an even feed of the material.

2. An apparatus as set forth, comprising a conveyer belt, weighing means associated therewith, means for feeding material to the conveyer belt, means actuable by said weighing means for controlling the rate of operation of the feeding means, whereby material may be fed to and over said conveyer belt at a predetermined substantially constant speed, said controlling means including a rotatable member movable responsively to the load on said weighing means, a source of light, a photo-electric cell, said rotatable member being mounted between said photo-electric cell and the source of light, whereby the amount of light falling upon photo-electric cell depends upon the load carried at any moment on the weighing conveyer belt, said rotatable member having opposite obliquely bounded portions, said obliquely bounded portions acting for relatively gradual varying the interception of the light to be received on said cell depending upon the position assumed by said rotatable member, thereby maintaining an even feed of the material.

3. The combination with a conveyer belt, adapted to contain upon it at all times one minute's production of wool fibres, of weighing means associated therewith, means for feeding said material to the conveyer belt and comprising independently controllable feeders in tandem whereby one feeds the other, means actuated by said weighing means for controlling the rate of operation of that feeder nearest in sequence to said conveyer belt, whereby said material can be fed to and over said conveyer belt at a substantially constant predetermined rate of speed, said means including a rotatable disk-like member formed with portions having different radii and opposite intervening obliquely bounded portions, said member being connected to the weighing means for movement proportionate to the load thereon, a photoelectric cell and a source of light at opposite sides of said member, whereby the amount of light falling upon said photoelectric cell will depend on the load carried at any moment on the conveyer belt, and the obliquely bounded opposite portions of the member will cause a relatively gradually varying quantity of light to be received on the cell depending upon the exact position of said member and connections from the cell to the feeder nearest in sequence to the conveyer belt to control the rate of feed in accordance with cell illumination, whereby the rate of feed is maintained substantially constant.

MARTIN EVOY.